(12) United States Patent
Jiang et al.

(10) Patent No.: US 7,697,451 B2
(45) Date of Patent: Apr. 13, 2010

(54) SYSTEM, METHOD AND APPARATUS FOR A RESEND RESPONSE

(75) Inventors: Qing Jiang, Long Grove, IL (US);
Daniel J. DeClerck, Lake Barrington, IL (US); Steve L. Sheya, Vernon Hills, IL (US)

(73) Assignee: Motorola, Inc., Schaumberg, IL (US)

( * ) Notice: Subject to any disclaimer, the term of this patent is extended or adjusted under 35 U.S.C. 154(b) by 783 days.

(21) Appl. No.: 11/473,025

(22) Filed: Jun. 23, 2006

(65) Prior Publication Data

US 2007/0297431 A1    Dec. 27, 2007

(51) Int. Cl.
*H04W 40/24* (2006.01)
(52) U.S. Cl. ..................... 370/252; 455/510
(58) Field of Classification Search .......... 370/217, 370/218, 221, 225, 242, 252, 328, 338, 400, 370/401; 455/229, 423, 510
See application file for complete search history.

(56) References Cited

U.S. PATENT DOCUMENTS

| 5,966,372 | A  | * | 10/1999 | Wright et al. ............. 370/329 |
| 6,215,782 | B1 | * | 4/2001 | Buskens et al. ........... 370/350 |
| 6,343,216 | B1 | * | 1/2002 | Kim et al. ................ 455/450 |
| 6,754,498 | B2 | * | 6/2004 | Chun et al. ............... 455/442 |
| 6,810,263 | B1 | * | 10/2004 | Cheng et al. ............. 455/510 |
| 7,107,054 | B2 | * | 9/2006 | Florkey et al. ........... 455/436 |
| 7,257,419 | B2 | * | 8/2007 | Hunzinger ................ 455/510 |

\* cited by examiner

*Primary Examiner*—Pankaj Kumar
*Assistant Examiner*—Duc T Duong
(74) *Attorney, Agent, or Firm*—MH2 Technology Law Group LLP

(57) ABSTRACT

An embodiment generally relates to a method of maximizing network efficiency. The method includes determining a state of a connect attempt from a network and re-transmitting a connect attempt response message to the network in response to the network's connect attempt being in a pending state after an attempt to setup a connection to the network fails.

9 Claims, 3 Drawing Sheets

SYSTEM, METHOD AND APPARATUS FOR A RESEND RESPONSE

FIELD

This invention relates generally to mobile communication systems, more particularly, systems, methods and apparatus for maximizing network efficiency.

DESCRIPTION OF THE RELATED ART

Wireless communication systems, such as analog and digital cellular communication systems, personal communication systems (PCS) and other similar wireless communication systems, provide a great deal of freedom to their users. A wireless communication system user is always in touch. And, in spite of the complexity underlying the wireless communication system, to the user using the system it is as easy as dialing a phone number.

These wireless communication systems are known to include a system infrastructure and communication devices constructed and programmed to operate in the respective system. The system infrastructure includes fixed network equipment, such as base transceiver sites (BTSs), system controllers (e.g., base site controllers (BSCs)), switching centers, routers, communication links, antenna towers, and various other known infrastructure components.

Sometimes, a user will be unable to place or receive a call, or an ongoing call will be unexpectedly disconnected. One possible cause of the failure is that at least a portion of the wireless communication system is a radio frequency (RF) link between the remote user and the system. There are a number of factors which influence how and why a call may not be completed or is disconnected. For example, system capacity, i.e., the number of available radio frequency links, may be exhausted. The user might be out of range, or interference may render the radio link unsuitable for maintaining the call. In any event, the user is inconvenienced.

Of course, in wireless communication systems, high call completion and high system capacity are requirements. One solution to increase call completion service, as a measure of quality of service, is to build more BTS and/or more powerful BTS or to increase the sensitivity of the handsets. However, these may be temporary solutions as more users join the network, the same type of problems may emerge as the traffic volume increases. A solution that increases the quality of service of a wireless communication call without increasing the infrastructure costs of the wireless communication system is needed.

SUMMARY

An embodiment generally relates to a method of maximizing network efficiency. The method includes determining a state of a connect attempt from a network and re-transmitting a connect attempt response message to the network in response to the network connect attempt being in a pending state after an attempt to setup a connection to the network fails.

Another embodiment pertains generally to a system. The system includes a cellular network and a mobile device configured to interface with the cellular network. The mobile device is configured to determine a state of a connect attempt from the cellular network and to re-transmit a connect attempt response message to the cellular network in response to the network connect attempt being in a pending state after an attempt to setup a connection to the cellular network fails.

Yet another embodiment relates generally to a computer readable storage medium on which is embedded one or more computer programs. The one or more computer programs implements a method of maximizing network efficiency. The one or more computer programs includes a set of instructions for determining a state of a connect attempt from a network and re-transmitting a connect attempt response message to the network in response to the network connect attempt being in a pending state after an attempt to setup a connection to the network fails. Accordingly, embodiments may improve the efficiency of network resources by resending a response to the network connection request. As a result, the calling user may not have to redial the call. Moreover, the receiving user may connect more quickly and reliably with the calling user.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of wireless communication systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, devices and methods for a communication setup of a mobile device terminated communication. More particularly, the mobile device may be configured to operate within the cells of a wireless communication network. A mobile device may receive a communication request from the network and will reply with a response. If the network receives the response of the mobile device, it will allocate necessary traffic resources to the mobile device to communicate with the calling party. If the network does not receive the response of the mobile device, or the mobile device does not receive the response from the network, or the network becomes unavailable to the mobile device, the attempt to setup the communication will fail. In this situation, the mobile device will abort the procedure of setting up the communication and try to find the wireless network again. On the other hand, the network will continue to hold the communication request in a pending state for a predefined amount of time. So by the time the mobile device recaptures the wireless network, it is possible that the network may still wait for the mobile device's response to complete the communication request. Unlike conventional wireless communication devices, the mobile device executing a resend response module may be further configured to resend a response to the network connection request. Accordingly, the mobile device may more efficiently utilize network resources after a failure to connect.

Figure 1:
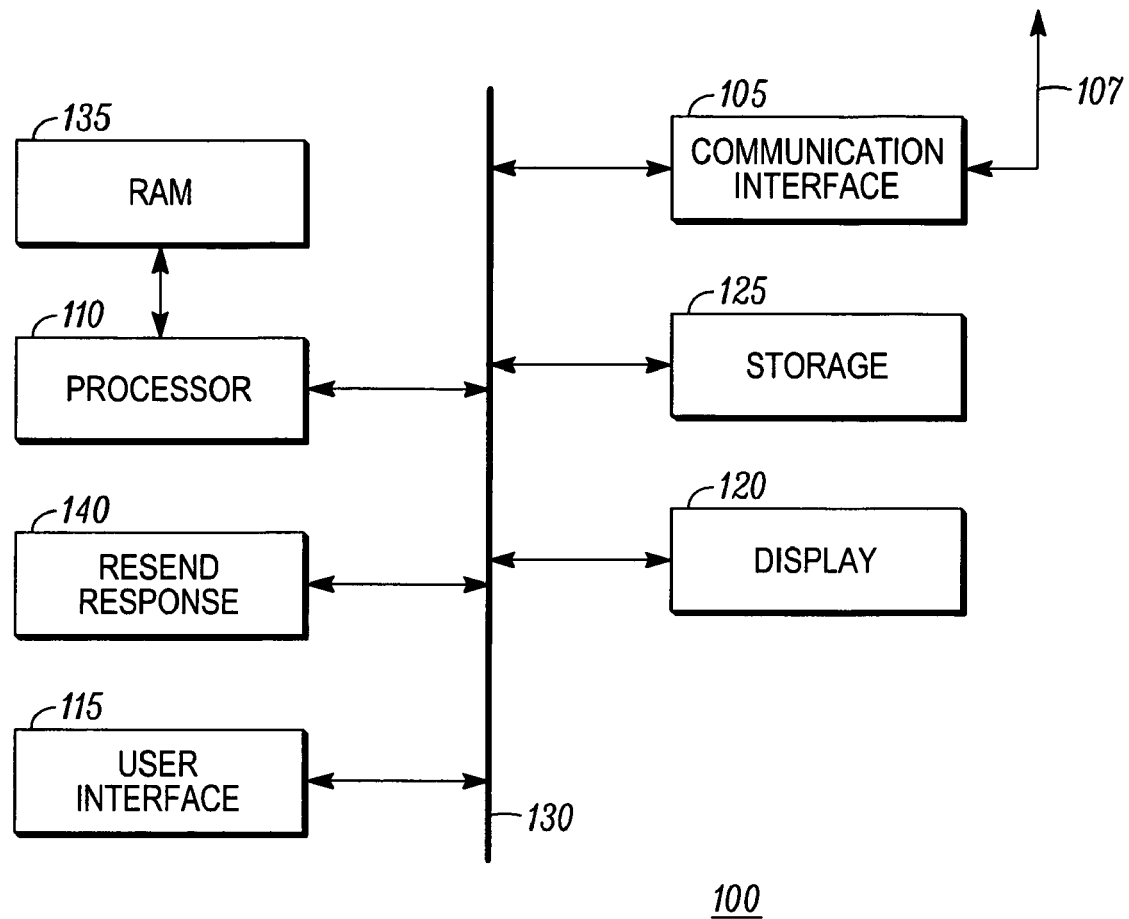
FIG. 1 illustrates an exemplary mobile device in accordance with an embodiment.

FIG. 1 illustrates an exemplary embodiment of a mobile device 100 in accordance with an embodiment. It should be readily apparent to those of ordinary skill in the art that the mobile device 100 depicted in FIG. 1 represents a generalized schematic illustration and that other components may be added or existing components may be removed or modified. Moreover, the mobile device 100 may be implemented using software components, hardware components, or combinations thereof.

As shown in FIG. 1, the mobile terminal 100 may include a communication interface 105, a processor 110, a user interface 115, a display module 120, and storage 125. The wireless communication interface 105 (labeled as communication interface in FIG. 1) may be configured to facilitate communication over an air interface with a base station of a cellular network such as the iDen™ network. More particularly, the communication interface 105 may transmit and receive digital voice packets through a radio frequency (RF) antenna 107. The communication interface 105 may also be configured to interface with a shared bus 130. Transmitting voice packets may be forwarded from the user interface 115 to the communication interface 105 over the shared bus 130 as well as received voice packets forwarded to the user interface 115 over the shared bus 130.

Processor 110 may be configured to interface with the shared bus 130. The processor 110 may be configured to implement the software that embodies the functionality of the mobile terminal 100, which may be stored in processor memory 135 (labeled as RAM in FIG. 1). The RAM 135 may be programmable read only memory, flash memory or similar type of high speed persistent storage. Processor 110 may be an application specific integrated circuit, programmable field gate array, a microprocessor, digital signal processor or similar type of computing platform.

Storage 125 may be configured to store information for a user of the mobile terminal 100. For example, a contact list, downloaded music, and/or digital images may be stored in storage 125. The storage 125 may be implemented using a persistent storage such as flash memory. In some embodiments, the storage function of the RAM 135 may be provided by storage 125.

User interface 115 may be configured to interface with the shared bus 130. The user interface 115 may also be configured to facilitate interaction with a user. As such, the user interface 115 may include media input and output mechanisms. For example, to facilitate voice communications, these mechanisms may include a microphone (not shown) for receiving analog speech signals from a user and a speaker (not shown) for playing out analog speech signals to a user. Further, the mobile terminal 100 may include digital/analog media signals and digital representations of those signals, for example, soft button on a keyless display.

The user interface 115 may also include a keypad (not shown). The keypad may be a Bell keypad, a QWERTY keyboard or similar mechanisms. In some embodiments, the keypad may be emulated on the display 120.

In accordance with various embodiments, the processor 110 may be configured to execute a resend response module 140. More particularly, when the mobile device 100 receives a communication request from the network, the resend response module 140 may be configured to instantiate a network request record to save information related to the communication request such as the time of the request is received, the network identity of the base station from which the request is received, etc.

After replying to the communication request, the resend response module 140 may also be configured to store the following status onto the network request record: (1) whether a network release for the communication request was received; (2) whether a release by the mobile device 100 was sent to the network in response to the communication request; and (3) whether the mobile device 100 received allocation of traffic resource from the network in response to the communication request.

If the attempt to setup the communication fails, the mobile device 100 will reacquire the wireless network. Once the mobile device 100 finds the wireless network again, the resend response module 140 may check for a previous network request record. If the network request record is still valid and the network sending the original request is still available, the resend response module 140 may resend the response to the network. A network request record may be valid when it meets the following requirements: (1) the mobile device 100 did not receive the network release on the communication request; (2) the mobile device 100 has not sent a release message to the network in response to the communication request; (3) the mobile device 100 did not receive an allocation of traffic resources from the network in response to the communication request; and (4) the time elapsed since the original time when the communication request was received is within a predefined limit. Moreover, the network sending the original request is deemed available if the network identity of the present base station is the same as that of the base station from which the original network communication request was received.

Accordingly, resend response module 140 may improve the efficiency of network resources by re-attempting to respond to an existing network connection request. As a result, the calling user may not have to redial and the network does not have to re-allocate the network resources for the redial call. Moreover, the receiving user may connect more quickly and reliably with the calling user.

Figure 2:
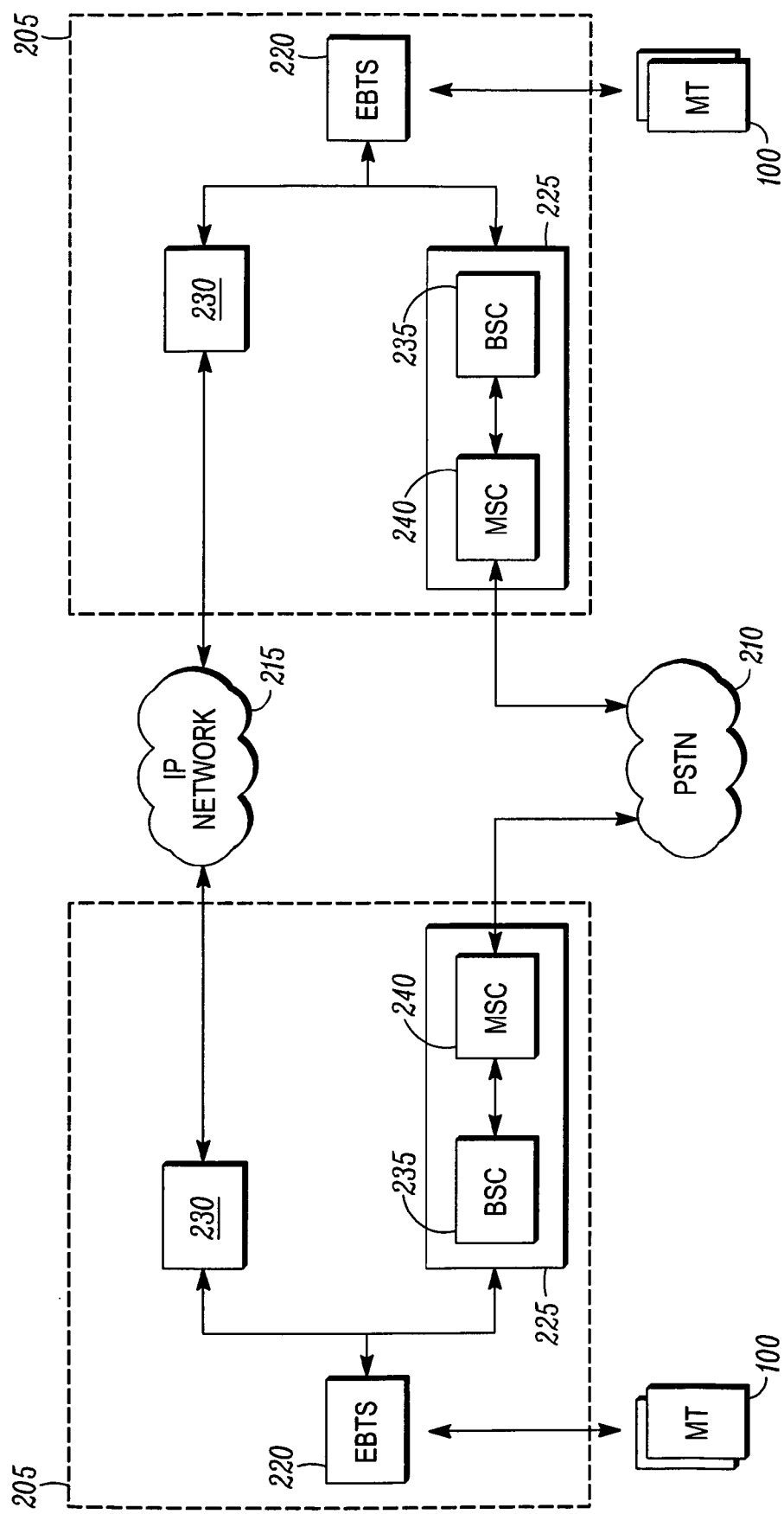
FIG. 2 illustrates an exemplary system where the mobile device shown in FIG. 1 may operate in accordance with another embodiment.

FIG. 2 illustrates an exemplary system 200 in accordance with another embodiment. It should be readily apparent to those of ordinary skill in the art that the system 200 depicted in FIG. 2 represents a generalized schematic illustration and that other components may be added or existing components may be removed or modified. Moreover, the system 200 may be implemented using software components, hardware components, or combinations thereof.

As shown in FIG. 2, the system 200 includes access cells 205. The access cells 205 may interface with a public switched telephone network 210 (labeled as PSTN in FIG. 2). The access cells 205 may also interface with an Internet Protocol ("IP") network 215. The IP network 215 may be the internet, a private local area network, a private wide area network, or combinations thereof.

Each access cell 205 may include an enhanced base transceiver station 220 (labeled as "EBTS"). The EBTS 220 may be configured to transmit and receive voice packets from mobile devices 100 within the coverage area of the EBTS 220. The EBTS 220 may also include a service integration module (not shown) that is configured to determine the current state of each mobile device in the coverage area of the EBTS 220.

The EBTS 220 may interface with an interconnect call module 225 and an IP services module 230. The interconnect call module 225 may include a base site controller (labeled as BSC) 235 coupled with a mobile switching center (labeled as MSC) 240 for handling cellular and circuit switched calls. The MSC 240 may also be interfaced with a home location and visitor location registers (not shown) for providing mobility management as known in the art. The BSC 235 can provide control and concentration functions for one or more EBTS sites and their associated mobile devices 100.

The IP services module 230 may be configured to provide Internet protocol services for the mobile devices 100. For example, push-to-talk communication, internet browsing, email functions, and other similar services may be provided through the IP services module 230.

Figure 3:
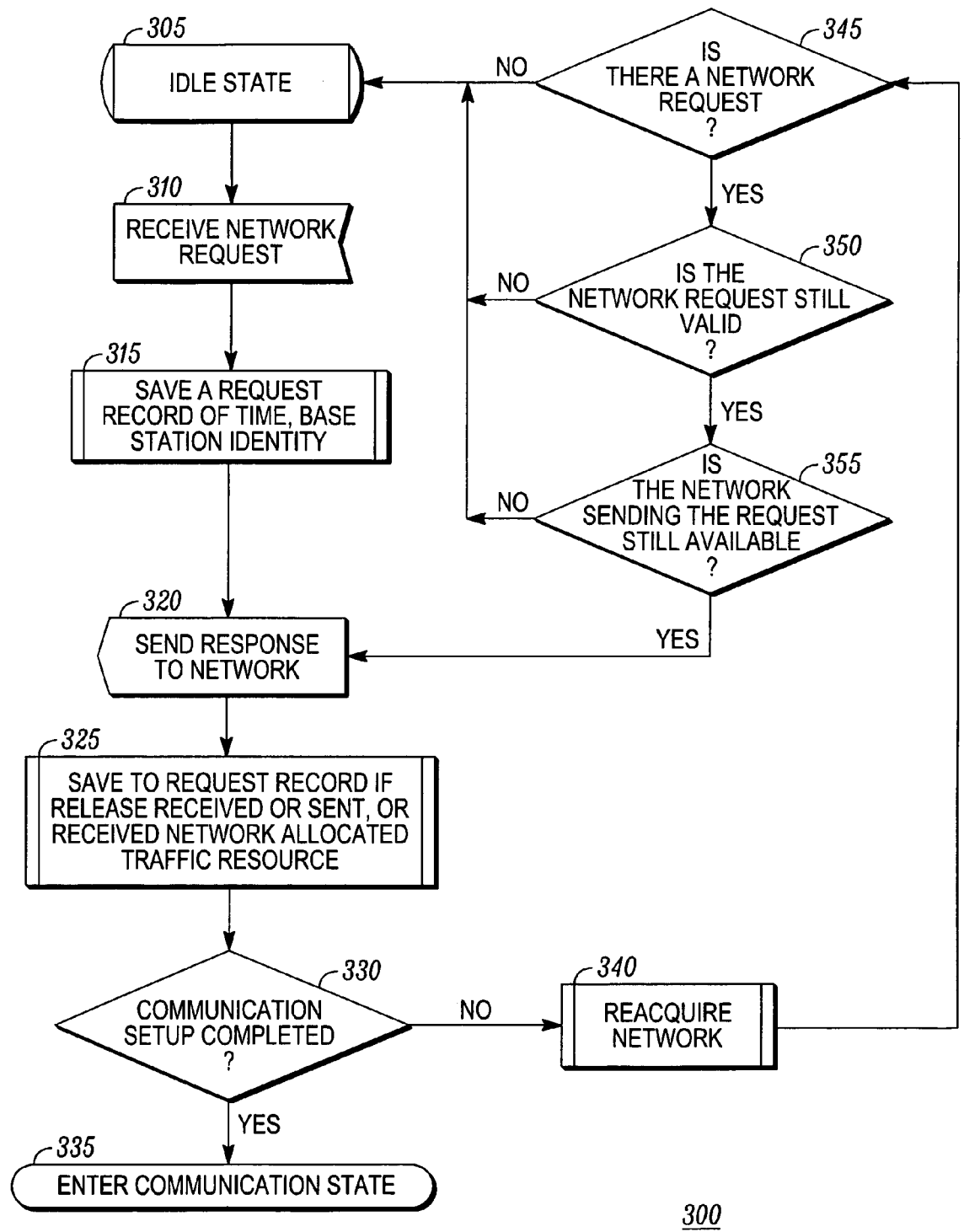
FIG. 3 illustrates an exemplary flow diagram in accordance with yet another embodiment.

FIG. 3 illustrates an exemplary flow diagram executed by the processor 110 in accordance with another embodiment. It should be readily apparent to those of ordinary skill in the art that the flow diagram 300 depicted in FIG. 3 represents a generalized schematic illustration and that other steps may be added or existing steps may be removed or modified.

As shown in FIG. 3, the processor 110 may be configured to enter the idle state 305. More specifically, the mobile device 100 may have been powered up and has registered itself with the local access cell of a BTS (e.g., EBTS 220) of a network (e.g., network 200). The mobile device 100 may then enter the idle state waiting for a connection request or a user to make a call.

In step 310, the mobile device 100 may receive a communication request from the network. For example, a second user may have dialed the mobile device 100 and the network 200 is forwarding the request to the mobile device 100.

In step 315, the mobile device 100 may begin processing the communication response. The mobile device 100 may instantiate a network request record that saves the time of the communication request and the identity of the local base station among other items. The network request may be stored in the RAM 135 or the storage 125.

In step 320, the mobile device 100 may process the communication request and send a response to the network 200. In step 325, the mobile device 100 may save additional information to the network request record. More specifically, the mobile device 100 may save whether the mobile device 100 received a release message from the network 200 associated with the communication request. The mobile device 100 may also save whether the mobile device 100 sent a release message to the network 200 in response to the received communication request. The mobile device 100 may be further configured to save whether the mobile device 100 received from the network 200 an allocation of traffic resource in response to the received communication request.

In step 330, the mobile device 100 may determine whether the communication protocol handshake, i.e., setup, was successful. If the communication protocol handshake was successful, the mobile device 100 may enter a communication state with the caller through the network 200. Otherwise, if the communication setup was unsuccessful, the mobile device may attempt to reacquire the network 200, in step 340.

In step 345, the mobile device 100 may determine whether a network request exists. If the network request does not exist, the mobile device 100 may return to the idle state of 305. Otherwise, if the network request exists, the mobile device 100 may determine whether the network request record is still valid, in step 350. A mobile device 100 may deem a network request record as valid if the following conditions are met: (1) the mobile device 100 has not received a release message from the network 200 in response to the received communication request; (2) the mobile device 100 has not sent a release message to the network 200 in response to the received communication request; (3) the mobile device 100 has not received the allocation of traffic resource from the network 200 for the received communication request; and (4) the time elapsed since the original time when mobile device 100 received the communication request has not exceeded a predefined limit.

If the network request is invalid, the mobile device 100 may return to the idle state of step 305. If the network request is still valid, the mobile device may determine whether the network 200 sending the request is still available, in step 355. A network may be deemed available if the network identity of the present base station is the same as that of the base station from which the original communication request was received.

If the network 200 sending the request is unavailable, the mobile device 100 may return to the idle state of step 305. Otherwise, if the network sending the request is still available, the mobile device 100 may proceed to the processing of step 320.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a non-transitory computer readable medium, which include storage devices, in compressed or uncompressed form. Exemplary non-transitory computer readable storage devices include conventional computer system RAM (random access memory), ROM (read-only memory), EPROM (erasable, programmable ROM), EEPROM (electrically erasable, programmable ROM), and magnetic or optical disks or tapes. Concrete examples of the foregoing include distribution of executable software program(s) of the computer program on a CD-ROM or via Internet download. In a sense, the Internet itself, as an abstract entity, is a non-transitory computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of maximizing network efficiency, the method comprising:
   receiving a connect attempt from a network;
   determining a state of the connect attempt;
   determining if the network is available by examining a stored network request record; and
   re-transmitting a connect attempt response message to the network in response to the network availability and the connect attempt being in a pending state after an attempt to setup a connection to the network fails.

2. The method of claim 1, wherein the pending state indicates that a release message regarding the network connection request has not been one of transmitted and received.

3. The method of claim 1, wherein the pending state indicates that a network message which allocates network communication resource regarding the network connection request has not been received.

4. The method of claim 1, wherein the pending state indicates that difference between the present time and the time associated with the connect request being received is within a predetermined amount.

5. The method of claim 1, further comprising:
   entering into an idle state by registering with a base transceiver site of the network.

6. A wireless communication system, comprising:
   a cellular network configured to interface with a mobile device, wherein the cellular network is configured to send a connect attempt to the mobile device, to determine a state of the connect attempt, and to receive a connect attempt response message from the mobile device based on a network request record stored on the mobile device and on the cellular network's connect attempt being in a pending state after an attempt to setup a connection to the mobile device fails.

7. The system of claim 6, wherein the pending state is one of a release message has not been one of transmitted and received; a network message which allocates network communication resource regarding the connection request has not been transmitted; the difference between the present time and the time associated with the network connect attempt being transmitted is within a predetermined amount.

8. A non-transitory computer readable storage medium on which is embedded one or more computer programs, said one or more computer programs implementing a method of maximizing network resources, said one or more computer programs comprising a set of instructions for:
   receiving a connect attempt from a network;
   determining a state of the connect attempt;
   determining if the network is available by examining a stored network request record; and
   re-transmitting a connect attempt response message to the network in response to the network availability and the network's connect attempt being in a pending state after an attempt to setup a connection to the network fails.

9. The non-transitory computer readable storage medium according to claim 8, said set of instructions further comprises:
   determining the network connect attempt in the pending state if the following conditions are true: a release message has not been one of transmitted and received; a network message which allocates network communication resource regarding the connection request has not been received; the difference between the present time and the time associated with the network connect attempt being received is within a predetermined amount.

* * * * *